United States Patent [19]

Martin

[11] Patent Number: 5,522,420
[45] Date of Patent: Jun. 4, 1996

[54] FUEL FLOW CUT-OFF SAFETY SWITCH BOX

[76] Inventor: Kelly W. Martin, 2191 Ellis Hollow Rd., Ithaca, N.Y. 14850

[21] Appl. No.: 292,276

[22] Filed: Aug. 18, 1994

[51] Int. Cl.$^6$ ............................... F16K 27/00; F16L 3/00
[52] U.S. Cl. ............................ 137/343; 137/377; 137/382
[58] Field of Search ............................ 137/377, 382, 137/343, 360, 362, 385; 248/49

[56] References Cited

U.S. PATENT DOCUMENTS

| | | |
|---|---|---|
| D. 297,254 | 8/1988 | Odate et al. . |
| 1,541,801 | 6/1925 | Durning ................................. 137/382 |
| 1,643,435 | 9/1927 | Allardice ............................. 137/382 X |
| 2,168,951 | 8/1939 | Caldwell ............................. 137/377 X |
| 2,990,846 | 7/1961 | Rives ..................................... 137/377 |
| 3,430,918 | 3/1969 | Kolze . |
| 4,275,753 | 6/1981 | Williams . |
| 4,526,301 | 7/1985 | King et al. ......................... 137/385 X |
| 4,790,275 | 12/1988 | Iida . |
| 5,115,837 | 5/1992 | Tupper . |

Primary Examiner—Kevin Lee
Attorney, Agent, or Firm—David L. Baker; Henry S. Miller; Rhodes & Ascolillo

[57] ABSTRACT

A metal or plastic container containing a ball valve switch and adapted to connect into a fuel line between the source and use, the container having front, back and side panels for protecting the switch and a door in the front panel for rapid access to the switch.

6 Claims, 3 Drawing Sheets

FUEL FLOW CUT-OFF SAFETY SWITCH BOX

BACKGROUND OF THE INVENTION

1. Field of the Invention

This invention relates generally to a means for controlling liquid fuel flow to motors and particularly to a container for protecting a fuel flow cut off switch.

2. Description of the Prior Art

Liquid fuel motors are in wide spread use throughout our culture both in the areas of transportation and general power supply. One drawback to the liquid fuel motor is the potential fire hazard caused by the heat and exhaust of a motor and the high volatility of the fuel. One method commonly utilized to lower the fire hazard is to separate the fuel source from the fuel use. It is routine to place a fuel tank of a vehicle in the rear while the motor is in the front. Some tractors and stationary power equipment have the fuel reserve in closer proximity, however in all known applications there is a fuel line between the fuel source and the fuel use. The fuel is sometimes fed through the line by gravity and other times forced by mechanical or electrical pumps.

Less frequently used are valves or switches to control the flow of the fuel, typically diesel fuel, kerosene or gasoline, between the source and the end use. With the increased use of electric fuel pumps the need is increased to provide a means to cut-off the flow of fuel in the case of emergency and a means to protect that means and make it identifiable to fire fighters and emergency rescue personnel.

U.S. Pat. No. 3,430,918 issued Mar. 4, 1969 to Kolze relates to a ball seat type fluid flow valve generally well known in the art. Williams received a U.S. Pat. No. 4,275,753 issued Jun. 30, 1981 for a fuel line cut-off switch that utilizes a weight in combination with a collapsible fuel line in a container located between the fuel pump and the carburetor of a motor. A ball valve with a lever handle is shown in design patent no. U.S. Des. No. 297,254 issued Aug. 16, 1988 to Odate et al. U.S. Pat. No. 4,790,275 issued Dec. 13, 1988 to Iida shows a fuel supply cut-off control system for automotive applications and acts as an engine speed governor, cutting off fuel when the engine exceeds a preselected rpm. Another ball valve for fuel line application is shown in the U.S. Patent to Tupper, U.S. Pat. No. 5,115,837 issued May 26, 1992, the valve includes multiple ports to include a fuel reserve position.

SUMMARY OF THE INVENTION

The invention is directed to a container or box for protecting a fuel line cut-off switch. A fuel line of the appropriate diameter is secured within the box and attached to a connector at each end that passes through the walls of the container and is adapted to mate with the fuel line. A hand operated, lever controlled, ball valve switch is mounted in the fuel line between the connectors. The box has a hinged cover door that may be latched in the closed position thereby protecting the switch from weather, misuse and abuse. The fuel line is supported in the protective container in a manner that will allow the container to be mounted in a universal orientation.

It is therefore an object of the invention to provide a new and improved container for protecting a fuel line cut-off switch.

It is another object of the invention to provide a new and improved container for protecting a fuel line cut-off switch that is capable of universal orientation.

It is a further object of the invention to provide a new and improved container for protecting a fuel line cut-off switch that is simple to install and easily used.

It is still another object of the invention to provide a new and improved container for protecting a fuel line cut-off switch that is low in cost.

It is still a further object of the invention to provide a new and improved container for protecting a fuel line cut-off switch which is of a durable and reliable construction.

It is another object to provide a new and improved container for protecting a fuel line cut-off switch which may be easily and efficiently manufactured and marketed.

It is another object to provide a new and improved combination of a fuel flow cut-off safety valve within a protective easily accessible container.

These and other advantages, features and objects of the invention will become more apparent from the following description taken in connection with the illustrative embodiment in the accompanying drawings.

BRIEF DESCRIPTION OF THE DRAWINGS

The invention will be better understood and objects other that those wet forth above will become apparent when consideration is given to the following detailed description thereof. Such description makes reference to the annexed drawings wherein.

DESCRIPTION OF THE PREFERRED EMBODIMENT

Figure 1:
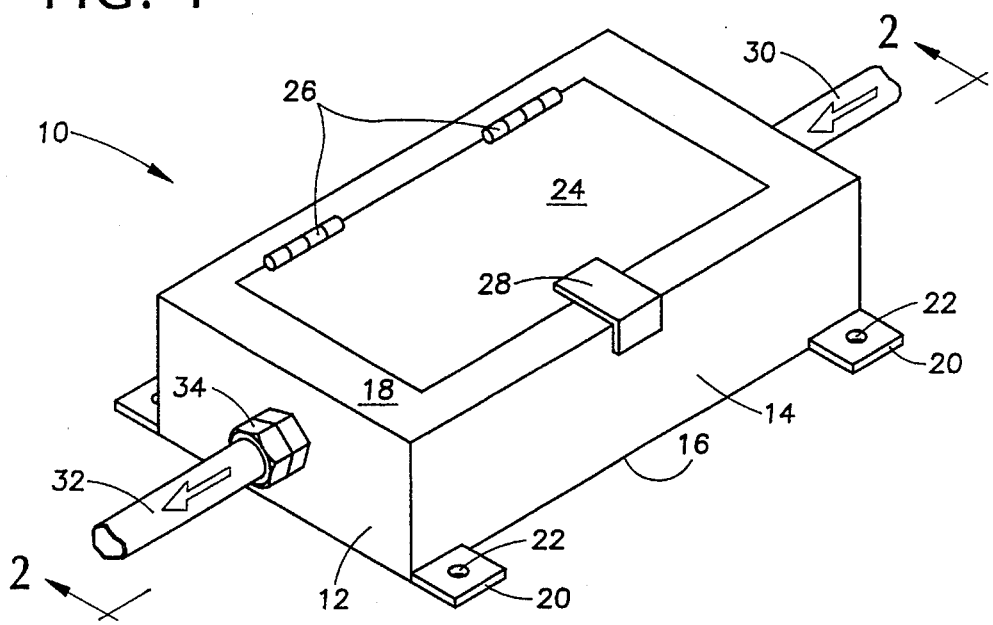
FIG. 1 is a perspective view of the invention.

Referring now to FIG. 1 there is shown the protective enclosure generally at 10. The enclosure consists of a pair of end panels 12 and side panels 14 with a back panel 16 and a front panel 18. Attached to the back panel are mounting tabs 20 with apertures 22 for convenience in mounting the container to any structure. The front panel includes a door 24 attached by a pair of hinges 26 and held closed by a latch 28 biased to engage the side panel 14. An input fuel line 30 is shown in its relative position to the enclosure 10 and output line 32 is similarly shown connected through adapter connector 34 to the enclosure.

Figure 2:
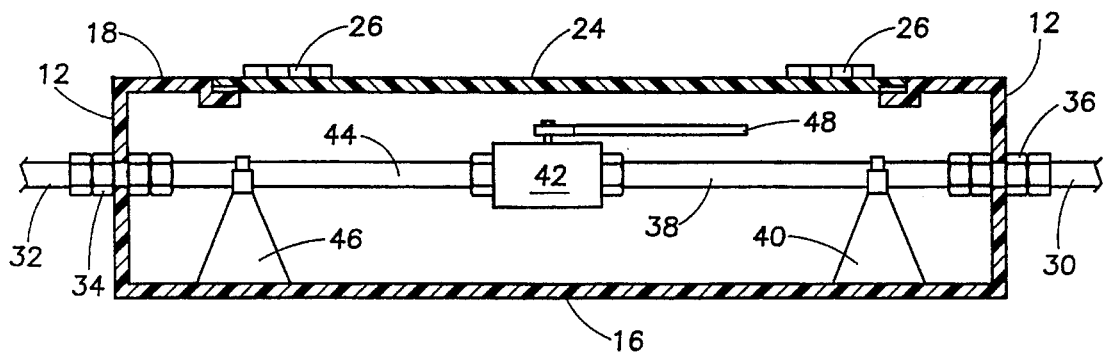
FIG. 2 is a side elevation view of the invention taken along lines 2—2 of FIG. 1.

Concerning FIG. 2, the view is taken along line 2—2 of FIG. 1 and shows fuel line 30 engaging the adapter connector 36 which is a double female connector and conveniently engages the standard male connector on most fuel lines. Interior fuel line 38 is supported by brace 40 and connects to ball valve switch 42. Another interior fuel line 44 connects to the ball valve and the adapter connector 34 and is supported by brace 46. The ball valve is operated by the hand lever 48.

Figure 3:
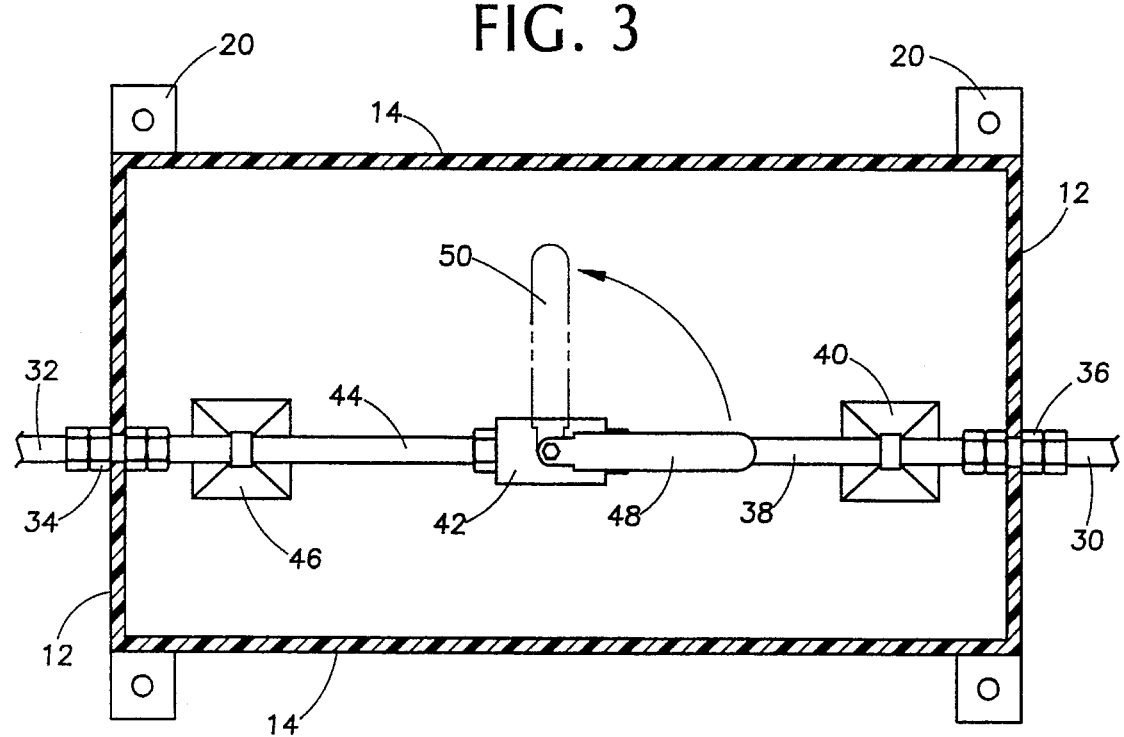
FIG. 3 is a plan view of the container with the top panel removed.

In FIG. 3 attention is drawn to the ball valve switch 42 where the operating hand lever 48 is shown parallel to the fuel line which conventionally indicates the "open" condition while the transverse position shown in phantom at 50 indicates the "closed" condition.

Figure 4:
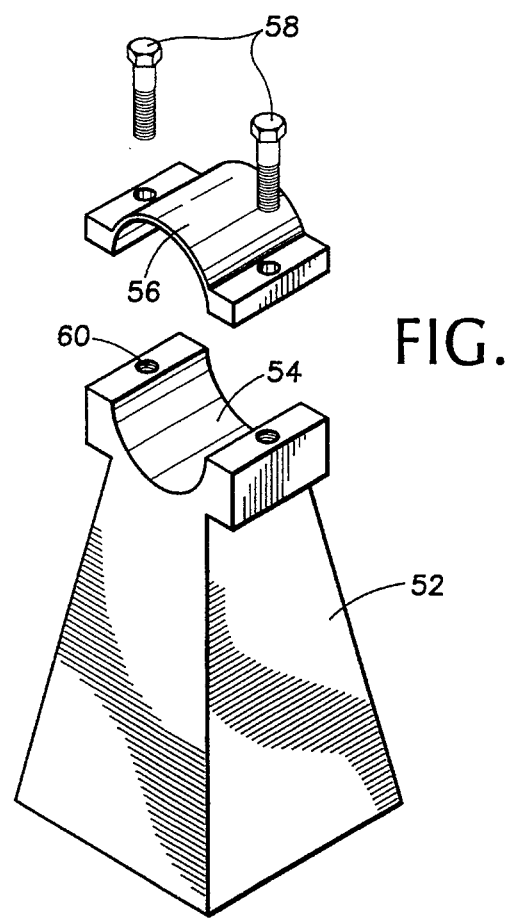
FIG. 4 is a perspective view of the fuel line; support mounted inside the container.

FIG. 4 shows the support for the fuel line in the form of a frustro-trapozidal figure 52 with an arcuate saddle 54 for receiving the fuel line and an accurately shaped cover 56 that secures the fuel line in place with bolts 58 that engage threaded holes 60 in the mating surface of the saddle. The brace is welded or otherwise affixed to the interior surface of the back panel of the protective enclosure.

Figure 5:
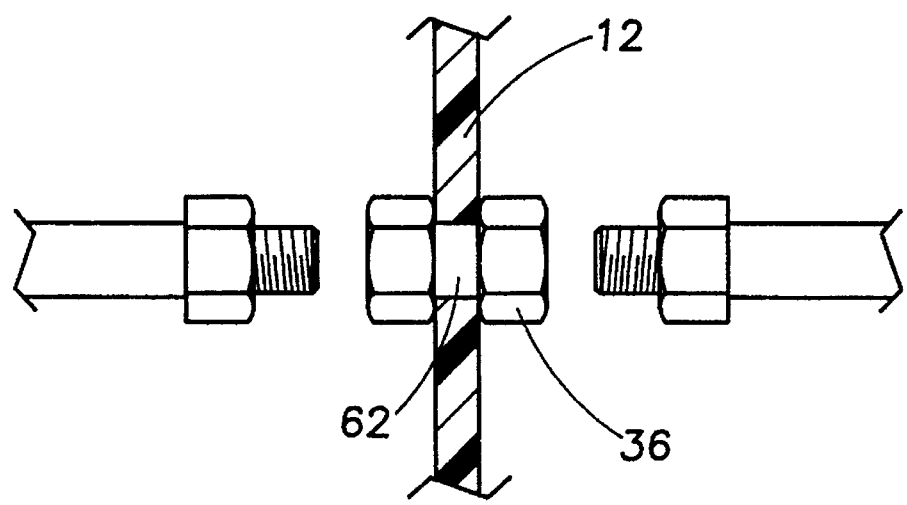
FIG. 5 is a cross sectional view of the female connectors that transition the fuel line through the walls of the protective container.

The adapter connector is shown in FIG. 5 where, the end panel 12 contains a means for a very short stub of fuel line 62 to pass therethrough and optionally be connected thereto. A pair of female fuel line receiving connectors are attached to the ends of the stub line, one inside the enclosure and one outside the enclosure. Male fuel line connectors engage the threaded female connectors and the valve switch then become part of the fuel line system.

The valve and protective container have universal application and only the diameter of the lines and valve need to vary in order to mate with the various size fuel line applications.

The box may be mounted in any handy place as in the engine compartment, under the floor or under the seat of a motor vehicle. It may be made from plastic or metal as a matter of designers choice and selected area of installation. In addition the container may be colored bright red to attract the attention of emergency personnel in the event of an accident or upset. Alternatively the invention may be secreted in an area not readily accessible and used as an anti theft device.

It should be understood, of course, that the foregoing disclosure relates to only a preferred embodiment of the invention and that numerous modifications or alterations may be made therein with out departing from the spirit and scope of the invention as set forth in the appended claims.

What is claimed is:

1. A fuel flow cut-off safety switch box comprising:

a container having front, back and four side panels joined forming a void;

mounting tabs attached to bottom corners of the container and extending therefrom;

a first fuel line receiving adapter attached to and passing through one of two opposing sides;

a second fuel line receiving adapter attached to and passing through another one of the two opposing sides;

fuel line support means mounted on the back panel of the container;

a fuel line connected to the fuel line receiving adapters within the container; and a ball valve switch, connected to the fuel line, between the fuel line support means.

2. A fuel flow cut-off safety switch box according to claim 1 further including: means connected to the support means for securing the fuel line on the support means.

3. A fuel flow cut-off safety switch box according to claim 2 further including: a door positioned in the front panel of the container for providing access to the ball valve switch.

4. A fuel flow cut-off safety switch box according to claim 3 further including: hinges for connecting the door to the front panel and a latch for securing the door closed.

5. A fuel flow cut-off safety switch box according to claim 4 wherein: the container is formed of metal.

6. A fuel flow cut-off safety switch box according to claim 4 wherein: the container is formed of polymeric material.

* * * * *